US012531008B2

(12) United States Patent
Hong

(10) Patent No.: US 12,531,008 B2
(45) Date of Patent: Jan. 20, 2026

(54) LIGHT EMITTING DISPLAY APPARATUS

(71) Applicant: LG Display Co., Ltd., Seoul (KR)

(72) Inventor: MooKyoung Hong, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 119 days.

(21) Appl. No.: 18/383,390

(22) Filed: Oct. 24, 2023

(65) Prior Publication Data

US 2024/0221617 A1 Jul. 4, 2024

(30) Foreign Application Priority Data

Dec. 30, 2022 (KR) ........................ 10-2022-0190935

(51) Int. Cl.
*G09G 3/32* (2016.01)

(52) U.S. Cl.
CPC ....... *G09G 3/32* (2013.01); *G09G 2310/0275* (2013.01); *G09G 2330/025* (2013.01); *G09G 2330/045* (2013.01)

(58) Field of Classification Search
CPC ............. G09G 3/32; G09G 2310/0275; G09G 2330/025; G09G 2330/045; G09G 3/3266; G09G 3/3275; G09G 3/3233; G09G 3/3291; G06F 3/041; G06F 3/044
See application file for complete search history.

(56) References Cited

U.S. PATENT DOCUMENTS

| | | | | |
|---|---|---|---|---|
| 2009/0200973 | A1* | 8/2009 | Uchiyama | H02M 1/32 318/400.26 |
| 2014/0034808 | A1* | 2/2014 | Zhang | H04N 25/78 327/419 |
| 2014/0084941 | A1* | 3/2014 | Yun | G09G 3/3233 324/543 |
| 2017/0365998 | A1* | 12/2017 | Luscan | H01H 33/596 |
| 2021/0027738 | A1* | 1/2021 | Huang | G09G 3/3696 |
| 2023/0170787 | A1* | 6/2023 | Sethumadhavan | H02M 1/32 323/271 |
| 2023/0196974 | A1* | 6/2023 | Im | G09G 3/3233 345/212 |

FOREIGN PATENT DOCUMENTS

| | | | |
|---|---|---|---|
| JP | 2012-208263 | A | 10/2012 |
| JP | 2014-85667 | A | 5/2014 |
| JP | 2019-78808 | A | 5/2019 |
| KR | 10-1535825 | B1 | 7/2015 |
| KR | 10-2069223 | B1 | 1/2020 |
| KR | 10-2208322 | B1 | 1/2021 |

* cited by examiner

*Primary Examiner* — Michael A Faragalla
(74) *Attorney, Agent, or Firm* — Birch, Stewart, Kolasch & Birch, LLP

(57) ABSTRACT

A light emitting display apparatus can include a power supply unit to supply power to a light emitting display panel having light emitting elements, a printed circuit board on which the power supply unit is mounted, chip-on-films connected between the printed circuit board and the light emitting display panel, data drivers mounted on the chip-on-films, a control driver to control the power supply unit and the data drivers, low-voltage lines extended from the printed circuit board to the light emitting display panel through the chip-on-films, and a main low-voltage line disposed on the printed circuit board and connected to the low-voltage lines and the power supply unit. Also, the light emitting display apparatus can include sensing capacitors connected to the main low-voltage line, in which each of the sensing capacitors is connected to one of the data drivers.

21 Claims, 5 Drawing Sheets

LIGHT EMITTING DISPLAY APPARATUS

CROSS-REFERENCE TO RELATED APPLICATIONS

This application claims priority to Korean Patent Application No. 10-2022-0190935 filed in the Republic of Korea, on Dec. 30, 2022, the entirety of which is hereby incorporated by reference into the present application as if fully set forth herein.

BACKGROUND

Field of the Invention

The present disclosure relates to a light emitting display apparatus and more particularly to a light emitting display apparatus with improved overcurrent sensing.

Discussion of the Related Art

Light emitting display apparatuses are mounted on electronic products such as televisions, monitors, notebook computers, smart phones, tablet computers, electronic pads, wearable devices, watch phones, portable information devices, navigation devices, or vehicle control display apparatus to perform a function of displaying images.

A light emitting display apparatus performs a function of displaying an image by outputting light by itself.

In a light emitting display apparatus, current flows to a light emitting display panel through a chip-on-film (COF) equipped with a data driver. In this situation, if a crack occurs in the light emitting display panel, a short circuit can occur in a cracked part to generate heat, thereby causing the light emitting display panel to burn or to generate a defect. Various protective functions are applied to a light emitting display apparatus of the related art to protect this phenomenon.

However, in a light emitting display apparatus of the related art, current is concentrated on a chip-on-film (COF) equipped with a data driver, and heat can be generated at the connection between the light emitting display panel and the COF, and thus, a limitation that the COF burn or melt can occur. As such, the inventor of the present application has recognized that a light emitting display apparatus of the related art does not have a function to address the limitation of damage to the COF due to the concentration of current to the COF.

Accordingly, there exists a need for a light emitting display apparatus capable of sensing a phenomenon in which an overcurrent flows to a COF.

SUMMARY OF THE DISCLOSURE

Accordingly, the present disclosure is directed to providing a light emitting display apparatus that substantially obviates one or more problems due to limitations and disadvantages of the related art.

An aspect of the present disclosure is directed to providing a light emitting display apparatus in which a data driver can sense overcurrent flowing in through a chip-on film.

Additional advantages and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description and claims hereof as well as the appended drawings.

To achieve these and other advantages and in accordance with the purpose of the disclosure, as embodied and broadly described herein, there is provided a light emitting display apparatus including a power supply unit for supplying power to a light emitting display panel having light emitting elements, a printed circuit board having the power supply unit mounted thereon, chip-on-films connected between the printed circuit board and the light emitting display panel, data drivers mounted on the chip-on-films, a control driver for controlling the power supply unit and the data drivers, low-voltage lines extended from the printed circuit board to the light emitting display panel through the chip-on-films and connected to the light emitting elements, a main low-voltage line provided on the printed circuit board, connected to the low-voltage lines, and connected to the power supply unit, and sensing capacitors connected to the main low-voltage line to correspond to the data drivers, in which each of the sensing capacitors is connected to the data driver.

It is to be understood that both the foregoing general description and the following detailed description of the present disclosure are examples and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE EMBODIMENTS

Figure 1:
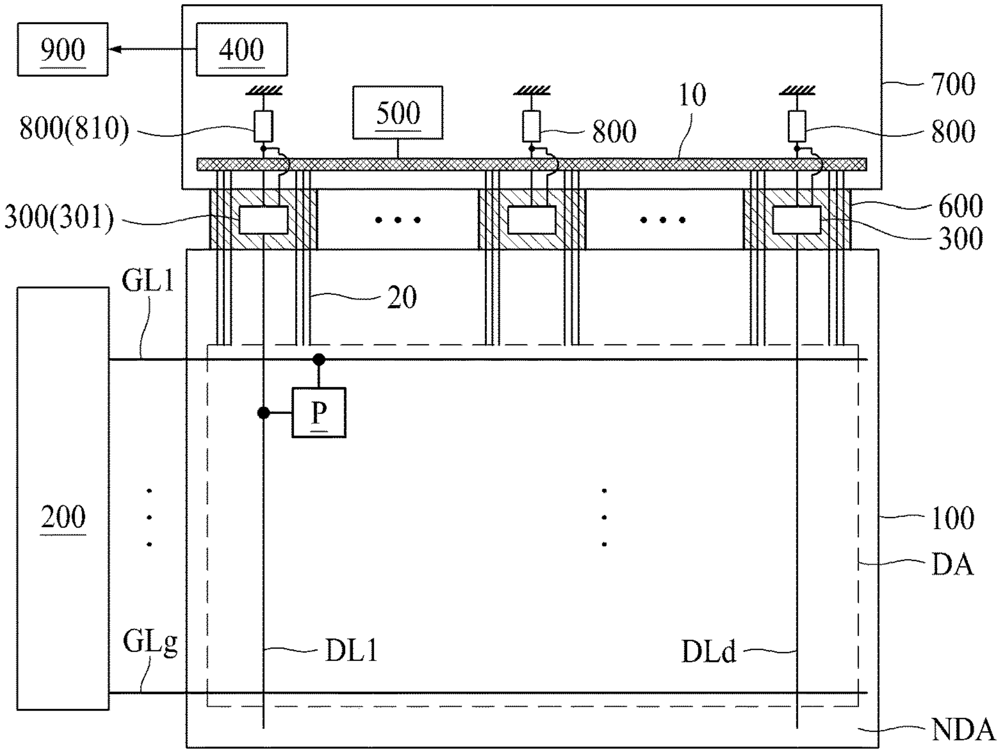
FIG. 1 is an example diagram illustrating a configuration of a light emitting display apparatus according to an embodiment of the present disclosure.

Reference will now be made in detail to the example embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure can, however, be embodied in different forms and should not be construed as limited to the embodiments set forth herein. Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present specification are used, another part can be added unless "only" is used. The terms of a singular form can include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts can be disposed between the two parts unless a more limiting term, such as "just" or "direct(ly)" is used.

In describing a time relationship, for example, when the temporal order is described as, for example, "after," "subsequent," "next," and "before," a situation that is not continuous can be included unless a more limiting term, such as "just," "immediate(ly)," or "direct(ly)" is used.

It will be understood that, although the terms "first," "second," etc. can be used herein to describe various elements, these elements should not be limited by these terms. These terms are only used to distinguish one element from another and may not define order or sequence. For example, a first element could be termed a second element, and, similarly, a second element could be termed a first element, without departing from the scope of the present disclosure.

In describing elements of the present disclosure, the terms "first," "second," "A," "B," "(a)," "(b)," etc. can be used. These terms are intended to identify the corresponding elements from the other elements, and basis, order, or number of the corresponding elements should not be limited by these terms. The expression that an element is "connected," "coupled," or "adhered" to another element or layer the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure can be partially or overall coupled to or combined with each other, and can be variously inter-operated with each other and driven technically as those skilled in the art can sufficiently understand. The embodiments of the present disclosure can be carried out independently from each other, or can be carried out together in co-dependent relationship.

Hereinafter, embodiments of the present disclosure will be described in detail with reference to the accompanying drawings. All the components of each light emitting display apparatus according to all embodiments of the present disclosure are operatively coupled and configured.

Figure 2:
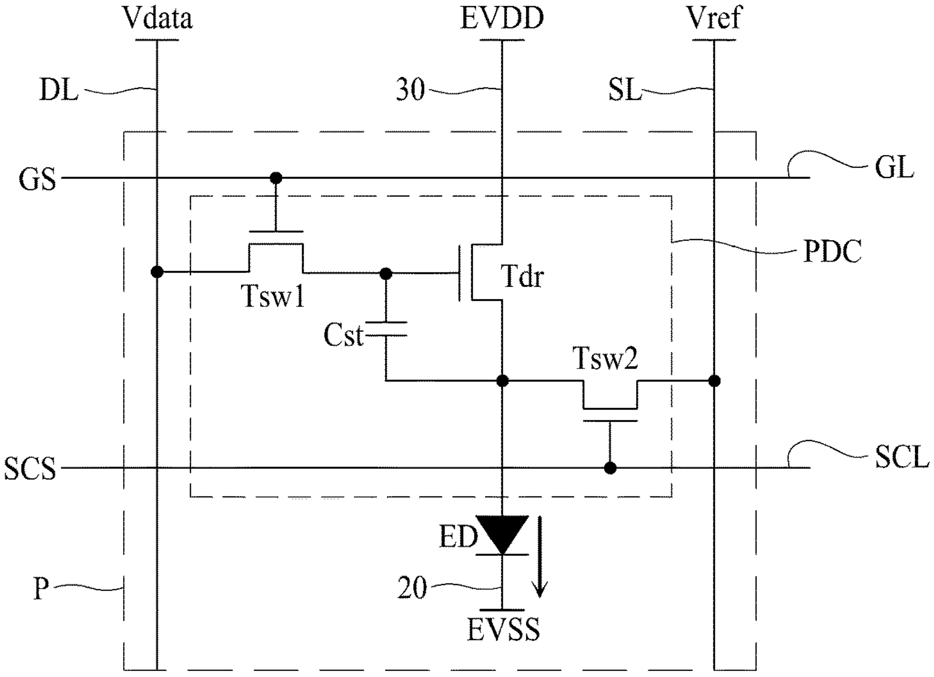
FIG. 2 is an example diagram illustrating a structure of a pixel applied to a light emitting display apparatus according to an embodiment of the present disclosure.
Figure 3:
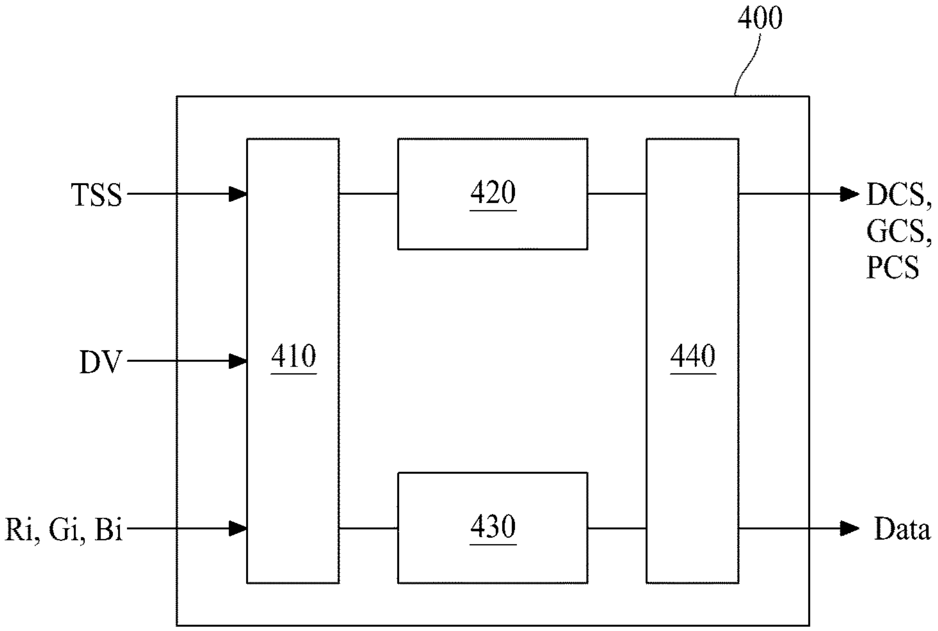
FIG. 3 is an example diagram illustrating a structure of a control driver applied to a light emitting display apparatus according to an embodiment of the present disclosure.

FIG. 1 is an example diagram illustrating a configuration of a light emitting display apparatus according to an embodiment of the present disclosure, FIG. 2 is an example diagram illustrating a structure of a pixel applied to a light emitting display apparatus according to an embodiment of the present disclosure, and FIG. 3 is an example diagram illustrating a structure of a control driver applied to a light emitting display apparatus according to an embodiment of the present disclosure.

The light emitting display apparatus, according to an embodiment of the present disclosure, can configure various kinds of electronic devices. The electronic devices can be, for example, smartphones, tablet personal computers (PCs), televisions (TVs), and monitors.

The light emitting display apparatus, according to an embodiment of the present disclosure, as illustrated in FIG. 1, can include a display panel 100 which includes a display area DA displaying an image and a non-display area NDA provided outside the display area DA, a gate driver 200 which supplies gate signals to a plurality of gate lines GL1 to GLg provided in the display area DA of the display panel 100, a data driver 300 which supplies data voltages to a plurality of data lines DLI to DLd provided in the display panel 100, a control driver 400 which controls driving of the gate driver 200 and the data driver 300, and a power supply unit 500 which supplies power to the control driver 400, the gate driver 200, the data driver 300, and the light emitting display panel 100. Here, g and d can be real numbers such as positive integers greater than 1. Moreover, the light emitting display apparatus according to an embodiment of the present disclosure can include a printed circuit board 700 having the power supply unit 500 and the control driver 400 mounted thereon, chip-on-films 600 connected between the printed circuit board 700 and the light emitting display panel 100, low-voltage lines 20 extended from the printed circuit board 700 to the light emitting display panel 100 through the chip-on-films 600 and connected to the light emitting elements ED, a main low-voltage line 10 provided on the printed circuit board 700, connected to the low-voltage lines 20, and connected to the power supply unit 500, and sensing capacitors 800 connected to the main low-voltage line 10 to correspond to the data drivers 300. Each of the sensing capacitors 800 can be connected to the data driver 300.

The light emitting display panel 100 includes a display area DA and a non-display area NDA. Gate lines GL1 to GLg, data lines DLI to DLd, and pixels P are provided in the display area DA. Accordingly, an image is output in the display area DA. Here, g and d are natural numbers. The non-display area NDA surrounds the outer periphery of the display area DA.

The pixel P included in the light emitting display panel 100, as illustrated in FIG. 2, can include a pixel driving circuit PDC which includes a switching transistor Tsw1, a storage capacitor Cst, a driving transistor Tdr, and a sensing transistor Tsw2, and a light emitting element ED connected to the pixel driving circuit PDC.

A first terminal of the driving transistor Tdr can be connected to a high voltage line 30 through which a high voltage EVDD is supplied, and a second terminal of the driving transistor Tdr can be connected to the light emitting element ED.

A first terminal of the switching transistor Tsw1 can be connected to a data line DL, a second terminal of the switching transistor Tsw1 can be connected to a gate of the driving transistor Tdr, and a gate of the switching transistor Tsw1 can be connected to a gate line GL.

A data voltage Vdata can be supplied through the data line DL from the data driver 300. A gate signal GS can be supplied through the gate line GL from the gate driver 200. The gate signal GS can include a gate pulse GP for turning on the switching transistor Tsw1 and a gate-off signal for turning off the switching transistor Tsw1.

The sensing transistor Tsw2 can be provided for measuring a threshold voltage or mobility of the driving transistor Tdr, or supplying a reference voltage Vref to the pixel driving circuit PDC. A first terminal of the sensing transistor Tsw2 can be connected to a second terminal of the driving transistor Tdr and the light emitting element ED, a second terminal of the sensing transistor Tsw2 can be connected to a sensing line SL through which the reference voltage Vref is supplied, and a gate of the sensing transistor Tsw2 can be connected to a sensing control line SCL through which a sensing control signal SCS is supplied.

The sensing line SL can be connected to the data driver 300, and can be connected to the power supply unit 500 through the data driver 300. That is, the reference voltage Vref supplied from the power supply unit 500 can be supplied to pixels P through the sensing line SL, and data sensing signals transmitted from the pixels P can be processed by the data driver 300.

The light emitting element ED can include a first electrode supplied with a high voltage EVDD through the driving transistor Tdr, a second electrode supplied with a low voltage EVSS which is lower than the high voltage, and a light emitting layer provided between the first electrode and the second electrode.

The structure of the pixel P applied to embodiments of the present disclosure is not limited to the structure illustrated in FIG. 2. Accordingly, the structure of the pixel P can be changed to various shapes.

The data driver 300 can supply data voltages to the data lines DLI to DLd, and can supply a reference voltage Vref to the sensing line SL. The data driver 300 can convert a data sensing signal received through the sensing line SL into a digital signal and transmit the digital signal to the control driver 400 (e.g., a controller or a processor).

Each of the data drivers 300 can be mounted on a chip-on film 600.

The data driver 300 can convert a signal received from the sensing capacitor 800 into a digital value and transmit the digital value to the control driver 400.

A detailed structure of the data driver 300 will be described with reference to FIGS. 5 and 6.

The control driver 400 can realign input image data Ri, Gi, and Bi transmitted from an external system 900 by using a timing synchronization signal TSS transmitted from the external system and can generate data control signals DCS which are to be supplied to the data driver 300 and gate control signals GCS which are to be supplied to the gate driver 200.

To this end, as illustrated in FIG. 3, the control driver 400 can include a data aligner 430 which realigns input image data Ri, Gi, and Bi to generate image data Data and supplies the image data Data to the data driver 300, a control signal generator 420 which generates the gate control signal GCS and the data control signal DCS by using the timing synchronization signal TSS, a control portion 410 which receives the timing synchronization signal TSS and the input image data Ri, Gi, and Bi from the external system 900, transmits the timing synchronization signal TSS to the control signal generator 420, and transmits the input image data to the data aligner 430, and an output portion 440 which supplies the data driver 300 with the image data Data generated by the data aligner 430 and the data control signal DCS generated by the control signal generator 420 and supplies the gate driver 200 with the gate control signal GCS generated by the control signal generator 420.

The control signal generator 420 can generate a power control signal PCS supplied to the power supply unit 500.

The control driver 400 can further include a storage portion for storing various information. The storage portion can be included in the control driver 400, but can be separated from the control driver 400 and provided independently.

The control portion 410 of the control driver 400 can analyze digital signals received from data drivers 300 to detect a chip-on film 600 with overcurrent, or an area with overcurrent in the chip-on film 600. When the overcurrent is detected, the control driver 400 can transmit an overcurrent detection signal to the external system 900. The overcurrent denotes a current which can be recognized as potentially damaging to the chip-on film 600. That is, when an overcurrent flows through the chip-on film 600, a defect in which the chip-on film 600 melts or burns can occur.

When the overcurrent detection signal is received, the external system 900 can perform a preset protection function. For example, the external system 900 can control the control driver 400 so that a warning message related to the overcurrent is displayed or can drive an alarm device provided in an electronic device (e.g., outputting an audio or visual notification).

The external system 900 can perform a function of driving the control driver 400 and an electronic device. For example, when the electronic device is a television (TV), the external system 900 can receive various kinds of sound information, image information, and letter information over a communication network and can transmit the received image information to the control driver 400. In this situation, the image information can be input image data Ri, Gi, and Bi.

The power supply unit 500 can generate various powers and supply the generated powers to the control driver 400, the gate driver 200, the data driver 300, and the light emitting display panel 100.

The gate driver 200 can be directly embedded into the non-display area NDA by using a gate-in panel (GIP) type. Moreover, the gate driver 200 can be provided in the display area DA in which light emitting elements ED are provided or can be provided on a film mounted in the non-display area NDA.

When the gate driver 200 is provided in the non-display area NDA by using the GIP type or provided in the display area DA, transistors configuring the gate driver 200 can be provided through the same process as transistors included in the pixels P of the display area DA.

The gate driver 200 can supply gate pulses to the gate lines GL1 to GLg.

When a gate pulse GP generated by the gate driver 200 is supplied to a gate of a switching transistor Tsw1 included in the pixel P, the switching transistor Tsw1 can be turned on. When the switching transistor Tsw1 is turned on, data voltage Vdata supplied through a data line DL can be supplied to the pixel P.

When a gate-off signal generated by the gate driver 200 is supplied to the switching transistor Tsw1, the switching transistor Tsw1 can be turned off. When the switching transistor Tsw1 is turned off, a data voltage may not be supplied to the pixel P any longer.

The gate signal GS supplied to the gate line GL can include the gate pulse GP and the gate-off signal.

A power supply unit 500 and a control driver 400 can be mounted on the printed circuit board 700.

Low-voltage lines 20 can extend from the printed circuit board 700 to the light emitting display panel 100 through the chip-on films 600, and can be connected to the light emitting elements ED. That is, the low voltage EVSS can be supplied to the light emitting elements ED through the low voltage lines 20. For example, each subpixel can be connected to a corresponding low-voltage line 20.

The printed circuit board 700 can be connected to the low-voltage lines 20 and the main low-voltage line 10 connected to the power supply unit 500 can be provided in the printed circuit board 700. That is, the low voltage EVSS can be supplied from the power supply unit 500 to the light emitting elements ED through the main low-voltage line 10 and the low-voltage lines 20. For example, the main low-voltage line 10 can be arranged in a direction (e.g., horizontal direction) that is perpendicular to the low-voltage lines 20 (e.g., arranged in a vertical direction). The printed circuit board 700 can be provided with the power supply unit 500. The control driver 400 can be provided on the printed circuit board 700, but can be provided on a separate circuit board. For example, when the light emitting display panel 100 is connected to a first printed circuit board by chip-on films 600 and the first printed circuit board is connected to a second printed circuit board through a flexible flat cable (FFC) and a connection member, the power supply unit 500 and the control driver 400 can be provided on the second printed circuit board and the main low-voltage line 10 can be provided on the first printed circuit board.

The printed circuit board 700 and the light emitting display panel 100 can be connected by the chip-on films 600. In this situation, the chip-on films 600 can physically connect the printed circuit board 700 with the light emitting display panel 100, and can also electrically connect the printed circuit board 700 with the light emitting display panel 100.

For example, as described above, the low-voltage lines 20 can extend to the light emitting display panel 100 through the chip-on film 600. Moreover, the data control signal DCS and the gate control signal GCS transmitted from the control driver 400 can be transmitted to the data driver 300 and the gate driver 200 through the chip-on films 600. Also, the data lines DL connected to the data driver 300 can extend to the light emitting display panel 100 through the chip-on films 600.

Finally, sensing capacitors 800 can be connected to the main low-voltage line 10 to correspond to data drivers 300.

The fact that the sensing capacitors 800 correspond to the data drivers 300 can denote that each of the sensing capacitors 800 is connected to the main low-voltage line 10 to be adjacent to one of the data drivers 300.

For example, as illustrated in FIG. 1, a sensing capacitor 800 can be mounted on the printed circuit board 700 to be adjacent to a data driver 300 of the chip-on film 600 provided on the left portion of the printed circuit board 700, another sensing capacitor 800 can be mounted on the printed circuit board 700 to be adjacent to a data driver 300 of the chip-on film 600 provided on the center portion of the printed circuit board 700, and another sensing capacitor 800 can be mounted on the printed circuit board 700 to be adjacent to a data driver 300 of the chip-on film 600 provided on the right portion of the printed circuit board 700. For example, each of the sensing capacitors 800 can be connected to one of the data drivers 300, in which each data driver 300 can be disposed on its own chip-on film 600, but embodiments are not limited thereto.

Each of the sensing capacitors 800 can be connected to the data driver 300, as illustrated in FIG. 1.

Figure 4:
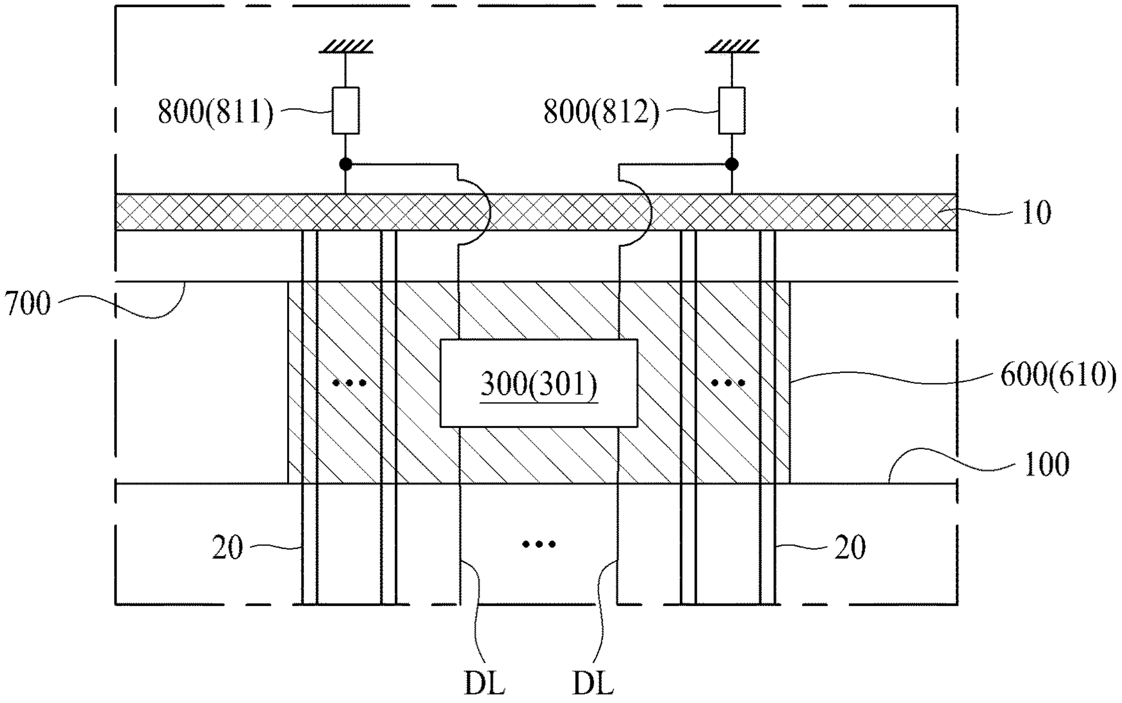
FIG. 4 is an example diagram illustrating a light emitting display panel, a sensing capacitor, and one of data drivers applied to a light emitting display apparatus according to an embodiment of the present disclosure.
Figure 5:
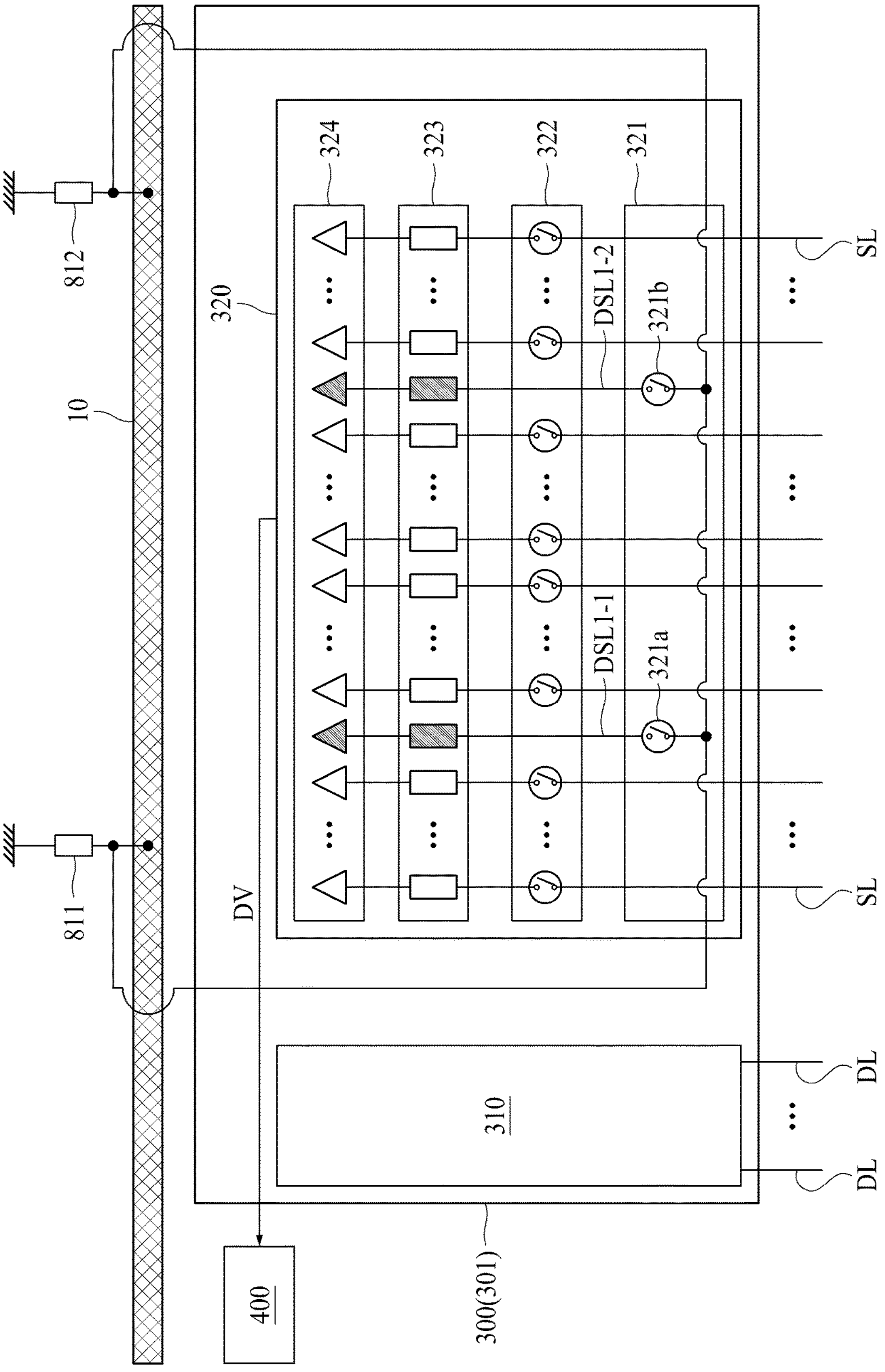
FIG. 5 is an example diagram illustrating a configuration of the data driver applied to the light emitting display apparatus according to an embodiment of the present disclosure.
Figure 6:
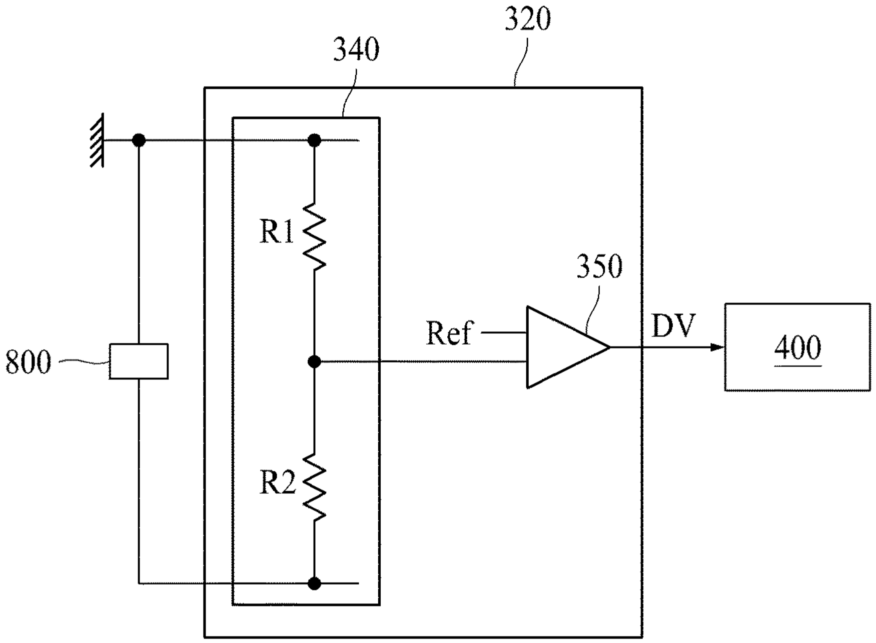
FIG. 6 is another example view illustrating a configuration of a sensing portion applied to the light emitting display apparatus according to an embodiment of the present disclosure.

FIG. 4 is an example diagram illustrating a light emitting display panel, a sensing capacitor, and one of data drivers applied to a light emitting display apparatus according to the present disclosure, FIG. 5 is an example diagram illustrating a configuration of the data driver applied to the light emitting display apparatus according to the present disclosure, and FIG. 6 is another example view illustrating a configuration of a sensing portion applied to the light emitting display apparatus according to the present disclosure.

For example, FIG. 1 illustrates one sensing capacitor 800 in one data driver 300. However, FIG. 4 illustrates that two sensing capacitors 811 and 812 are connected to one data driver 300.

That is, in the light emitting display apparatus according to embodiments of the present disclosure, one sensing capacitor 800 can be connected to one data driver 300, as shown in FIG. 1, or two sensing capacitors 811 and 812 can be connected to one data driver 300, as shown in FIG. 4.

In the following description, when the light emitting display apparatus shown in FIG. 1 is used as an example embodiment of the present disclosure, a sensing capacitor 800, which is provided at the leftmost side among the sensing capacitors 800 shown in FIG. 1, is referred to as a first sensing capacitor 810, a data driver 300 to which the first sensing capacitor 810 is connected is referred to as a first data driver 301, and a chip-on-film 600 on which the first data driver 301 is mounted is referred to as a first chip-on-film 610.

Also, in the following description, when the light emitting display apparatus shown in FIG. 4 is used as an example embodiment of the present disclosure, a sensing capacitor 800, provided on the left side among the sensing capacitors 800 shown in FIG. 4 is referred to as a (1-1)th sensing capacitor 811, a sensing capacitor 800 provided on the right side is referred to as a (1-2)th sensing capacitor 812, a data driver 300 in which the (1-1)th sensing capacitor 811 and the (1-2)th sensing capacitor 812 are connected is referred to as a first data driver 301, and a chip-on-film 600 on which the first data driver 301 is mounted is referred to as a first chip-on-film 610. For example, in the situation of the first data driver 301 shown in FIGS. 1 and 4, only the first sensing capacitor 810 can be connected thereto as shown in FIG. 1, or the (1-1)th sensing capacitor 811 and the (1-2)th sensing capacitor 812 can be connected thereto as shown in FIG. 4. Also, in the light emitting display apparatus shown in FIG. 4, the data driver 300 is connected between the (1-1)th sensing capacitor 811 and a main low-voltage line 10 and is connected between the (1-2)th sensing capacitor 812 and the main low-voltage line 10.

In each of the remaining data drivers 300, only one sensing capacitor 800 can be connected thereto as shown in FIG. 1, and two sensing capacitors 800 can be connected thereto as shown in FIG. 4. In addition, the contents described below can be also applied to the remaining data drivers 300 other than the first data driver 301.

First, as described with reference to FIGS. 1 to 3, a printed circuit board 700 and a light emitting display panel 100 are connected by the chip-on films 600, the data drivers 300 are mounted on each of the chip-on films 600, low-voltage lines 20 extend from the printed circuit board 700 to the light emitting display panel 100, the low-voltage lines 20 are connected to light emitting elements ED, the main low-voltage line 10 connected to the low-voltage lines 20 is provided on the printed circuit board 700, and the sensing capacitors 800 are connected to the main low-voltage line 10 while being provided to correspond to the data drivers 300. In this situation, each of the sensing capacitors 800 is connected to a data driver 300.

For example, as shown in FIG. 1, the low-voltage lines 20 are connected to the main low-voltage line 10, the first sensing capacitor 810 is connected to a portion of the main low-voltage line 10 adjacent to the first data driver 301, and the first sensing capacitor 810 is connected to the first data driver 301. Also, a width of the main low-voltage line 10 can be larger than a width of each of the low-voltage lines 20, in order to improve electrical resistance and avoid a drop in voltage.

In this situation, the plurality of low-voltage lines 20 are provided in the first chip-on-film 610 on which the first data driver 301 is mounted. Some of the low-voltage lines 20 provided in the first chip-on-film 610 can be provided on a first side of the first data driver 301, for example, on the left side of the first data driver 301 in FIG. 1, and the remaining low-voltage lines 20 can be provided on a second side of the first data driver 301, for example, on the right side of the first data driver 301 in FIG. 1. That is, the plurality of low-voltage lines 20 can be distributed on the first side and the second side of the first data driver 301 in the first chip-on-film 610.

In addition, as shown in FIG. 4, the low-voltage lines 20 are connected to the main low-voltage line 10, the (1-1)th sensing capacitor 811 and the (1-2)th sensing capacitor 812 are connected to a portion of the main low-voltage line 10 adjacent to the first data driver 301, and the (1-1)th sensing capacitor 811 and the (1-2)th sensing capacitor 812 are connected to the first data driver 301.

In this situation, the (1-1)th sensing capacitor 811 can be provided at a portion of the main low-voltage line 10 adjacent to the first side of the first data driver 301, and the (1-2)th sensing capacitor 812 can be provided at a portion of the main low-voltage line 10 adjacent to the second side of the first data driver 301.

Then, the first date driver 301 can include a data voltage generating portion 310 for supplying data voltages Vdata to data lines DL provided in the light emitting display panel 100, and a sensing portion 320 for changing a signal transmitted from the first sensing capacitor 810 connected to the portion of the main low-voltage line 10 adjacent to the first data driver 301 to a digital value DV, and transmitting the digital value DV to a control driver 400.

The data voltage generating portion 310 is applied to the general light emitting display apparatus for supplying the data voltages Vdata to the data lines DL. Therefore, a detailed description thereof will be omitted.

In this situation, the sensing portion 320 shown in FIG. 5 can sense threshold voltages or mobility of driving transistors Tdr, can sense threshold voltages or other characteristics of the light emitting elements ED, and can additionally sense a current flowing to the low-voltage lines 20.

To this end, as shown in FIG. 5, the sensing portion 320 can include a dummy switching portion 321 having a (1-1)th switch **321*a* for transmitting the signal from the (1-1)th sensing capacitor 811 to a (1-1)th dummy sensing line DSL1-1 and a (1-2)th switch 321*b* for transmitting the signal from the (1-2)th sensing capacitor 812 to a (1-2)th dummy sensing line DSL1-2, a sensing switching portion 322 having sensing switches connected with sensing lines SL provided in pixels P, a holding portion 323 for holding the signals transmitted from the dummy switching portion 321 or sensing switching portion 322, and a converting portion 324 for converting the signals transmitted from the holding portion 323 into the digital value DV and transmitting the digital value DV to a control driver 400**.

The (1-1)th switch **321*a* is provided between the (1-1)th sensing capacitor 811 and the (1-2)th dummy sensing line DSL1-1, and the (1-2)th switch 321*b* is provided between the (1-2)th sensing capacitor 812 and the (1-2)th dummy sensing line DSL1-2. The (1-1)th switch 321*a* and the (1-2)th switch 321*b* can be simultaneously turned-on or simultaneously turned-off according to a control signal transmitted from the control driver 400**.

The sensing switching portion 322 can transmit sensing signals received from the sensing lines SL to the holding portion 323. The sensing switches provided in the sensing switching portion 322 can also be simultaneously turned-on or simultaneously turned-off according to the control signal transmitted from the control driver 400.

The holding portion 323 holds or stores the signals transmitted from the dummy switching portion 321 or sensing switching portion 322 and then simultaneously transmits the signals to the converting portion 324.

For an overcurrent sensing period, the converting portion 324 converts the signal transmitted through the dummy switching portion 321 and the holding portion 323 into the digital value DV, and transmits the digital value DV to the control driver 400. For a pixel sensing period, the converting portion 324 converts the signal transmitted through the sensing switching portion 322 and the holding portion 323 into the digital value DV, and transmits the digital value DV to the control driver 400.

For example, the sensing portion 320 shown in FIG. 5 includes configurations for sensing currents applied to the low-voltage lines 20, and also includes configurations for sensing the characteristics of driving transistors Tdr and light emitting elements ED in the related art light emitting display apparatus.

Therefore, a detailed description of configurations and functions for sensing the characteristics of transistors Tdr and light emitting elements ED for the pixel sensing period will be omitted.

Then, for the overcurrent sensing period, the first data driver 301 can change the signal transmitted from the (1-1)th sensing capacitor 811 to a (1-1)th digital value and can transmit the (1-1)th digital value to the control driver 400, and also can change the signal transmitted from the (1-2)th sensing capacitor 812 to a (1-2)th digital value and can transmit the (1-2)th digital value to the control driver 400.

To this end, the (1-1)th switch **321*a* and the (1-2)th switch 321*b*** can be turned-on in the overcurrent sensing period.

In this situation, a control portion 410 of the control driver 400 can determine a position or a location where an overcurrent occurs in the first side or the second side of the first chip-on-film 610 with respect to the first data driver 301 by using the digital values DV transmitted from the first data driver 301 mounted on the first chip-on-film 610 during the overcurrent sensing period. For example, the control portion 410 can accurately detect a fault in the left side or the right side of the first chip-on-film 610 with respect to the first data driver 301.

For example, as shown in FIGS. 4 and 5, the (1-1)th sensing capacitor 811 is connected to the main low-voltage line 10 at the position adjacent to the first side of the first chip-on-film 610, and the (1-2)th sensing capacitor 812 is connected to the main low-voltage line 10 at the position adjacent to the second side of the first chip-on-film 610. When the overcurrent flows on the first side of the first chip-on-film 610, the magnitude of the (1-1)th current flowing to the converting portion 324 through the (1-1)th switch 321*a* can be greater than the magnitude of the (1-2)th current flowing to the converting portion 324 through the (1-2)th switch 321*b*. Therefore, the (1-1)th digital value in which the (1-1)th current is converted and the (1-2)th digital value in which the (1-2)th current is converted can be different from each other. In this situation, the (1-1)th digital value can deviate from a preset range. The preset range means the digital value determined not to be the overcurrent. For example, the control portion 410 of the control driver 400 can compare the magnitude of the (1-1)th current flowing to the converting portion 324 through the (1-1)th switch 321*a* with the magnitude of the (1-2)th current flowing to the converting portion 324 through the (1-2)th switch 321*b* and if the different is greater than a predetermined value or outside of a predetermined range, then a fault can be determined.

Also, when the overcurrent flows on the second side of the first chip-on-film 610, the magnitude of the (1-2)th current flowing to the converting portion 324 through the (1-2)th switch 321*b* can be greater than the magnitude of the (1-1)th current flowing to the converting portion 324 through the (1-1)th switch 321*a*. Therefore, the (1-2)th digital value in which the (1-2)th current is converted and the (1-1)th digital value in which the (1-1)th current is converted can be different from each other. In this situation, the (1-2)th digital value can deviate from a preset range. The preset range means the digital value determined not to be the overcurrent (e.g., a normal operating range).

In this situation, the control driver 400 can receive the (1-1)th digital value matched with information about the (1-1)th switch 321*a* and can receive the (1-2)th digital value matched with information about the (1-2)th switch 321*b*. Therefore, the control driver 400 can compare the (1-1)th digital value and the (1-2)th digital value and can determine whether the overcurrent flows through one of the (1-1)th sensing capacitor 811 and the (1-2)th sensing capacitor 812. Therefore, the control driver 400 can determine the position or the exact location where the overcurrent occurs in the first side or the second side of the first chip-on-film 610 with respect to the first data driver 301.

If no overcurrent flows, the (1-1)th digital value and the (1-2)th digital value can be included in the preset range and can have similar values (e.g., within the normal operating range). Therefore, the control driver 400 determines that no overcurrent flows through the low-voltage lines 20 provided in the first chip-on-film 610.

Then, the control driver 400 can determine which chip-on-film 600 has the overcurrent by using the digital values DV transmitted from the data drivers 300 during the overcurrent sensing period. That is, according to the example described above with reference to FIGS. 4 and 5, the control driver 400 can determine whether the overcurrent occurs in any of the first side and the second side of the chip-on-film 600, as well as the position or the location of the chip-on-film 600 in which the overcurrent is generated.

However, in FIGS. 4 and 5, if any one of the (1-1)th sensing capacitor 811 and the (1-2)th sensing capacitor 812 is connected to the first data driver 301, and one sensing capacitor 800 is connected to each of the remaining data drivers 300, the control driver 400 can determine which chip-on-film 600 has the overcurrent.

That is, when the first sensing capacitor 810 shown in FIG. 1 is connected to the sensing portion 320 shown in FIG. 5, the first sensing capacitor 810 can be any one of the (1-1)th sensing capacitor 811 and the (1-2)th sensing capacitor 812. Hereinafter, an example in which the (1-1)th sensing capacitor 811 is the first sensing capacitor 810 will be described. In this situation, the (1-2)th switch 321*b* is not provided in the sensing portion 320 shown in FIG. 5, and only the (1-1)th switch 321*a* can be provided in the sensing portion 320. Also, in each of the remaining data drivers 300, only the (1-1)th switch 321*a* connected to the (1-1)th sensing capacitor 811 can be provided in the sensing portion 320.

When one sensing capacitor 800 is connected to each of the data drivers 300, and the overcurrent flows in at least one of the first and second sides of the first chip-on-film 610, the magnitude of the (1-1)th current flowing to the converting portion 324 through the (1-1)th switch 321*a* can be greater than the magnitude of the current flowing to the converting portion 324 of the remaining data drivers 300. Therefore, the (1-1)th digital value in which the (1-1)th current is converted and the digital value generated in the remaining data drivers 300 can be different from each other. In this situation, the (1-1)th digital value can deviate from a preset range. For example, the current sensed form one data driver can be compared with the currents sensed from the other data drivers. The preset range means the digital value determined not to be the overcurrent (e.g., a normal operating range).

In this situation, the control driver 400 can receive the (1-1)th digital value matched with information about the first data driver 301, and can receive the remaining digital values matched with information about the remaining data drivers 300. Accordingly, the control driver 400 can compare the (1-1)th digital value and the remaining digital values and can determine whether the overcurrent flows through the (1-1)th sensing capacitor 811. Therefore, the control driver 400 can determine that the overcurrent is generated in the first chip-on-film 610 provided with the first data driver 301.

If no overcurrent flows, the (1-1)th digital value and the remaining digital values can be included in the preset range and can have similar values (e.g., within the normal operating range). Accordingly, the control driver 400 can determine that no overcurrent flows in any of the chip-on-films 600 and all chip-on-films 600 are operating normally.

The sensing portion 320 shown in FIG. 5 can change the current transmitted from the first sensing capacitor 810 (or (1-1)th sensing capacitor 811) connected to the position of the main low-voltage line 10 adjacent to the first data driver 301 to the digital value DV for the overcurrent sensing period, and can transmit the digital value DV to the control driver 400. In this situation, the control driver 400 can compare the digital value received from the first data driver 301 and the digital values received from the remaining data drivers 300 and can recognize the first data driver 301 into which the overcurrent is input. Thus, the control driver 400 can determine that the overcurrent flows in the first chip-on-film 610 on which the first data driver 301 is mounted. That is, the control driver 400 determines which exact chip-on-film 600 has the overcurrent by using the digital values VD transmitted from the data drivers 300 during the overcurrent sensing period.

That is, the sensing portion 320 can determine which exact chip-on-film 600 has the overcurrent and where it is located, and can determine which of the first side and the second side of the chip-on-film 600 has the overcurrent (e.g., can determine which side or area of the chip-on-film 600 is damaged).

Finally, the sensing portion 320 can be formed in the structure illustrated in FIG. 5 or can be formed in the structure illustrated in FIG. 6. However, the sensing portion 320 illustrated in FIG. 6 can be included in the sensing portion 320 illustrated in FIG. 5. In this situation, the dummy switching portion 321 can be omitted from the sensing portion 320 illustrated in FIG. 5.

For example, the sensing portion 320 shown in FIG. 6 divides the voltage applied to the sensing capacitor 800, whereby the generated digital value DV can be transmitted to the control driver 400. For example, the sensing capacitor 800 can be connected to a voltage divider.

To this end, as shown in FIG. 6, the sensing portion 320 can include a resistance portion 340 connected to the sensing capacitor 800, and a comparing portion 350 for generating the digital value DV by using the signal received from the resistance portion 340 and transmitting the digital value DV to the control driver 400.

The resistance portion 340 can include at least two resistors R1 and R2 to divide the voltage applied to the sensing capacitor 800 into the voltages of different sizes. For example, when the two resistors R1 and R2 have different resistance values and the overcurrent flows to the sensing capacitor 800, the voltage or current which deviates the preset range can be generated between the two resistors R1 and R2. The preset range refers to the range of voltage or current determined not to be the overcurrent (e.g., a normal operating range).

In this situation, the voltage or current generated between the two resistors R1 and R2 is transmitted to the comparing portion 350, and the comparing portion 350 compares the voltage or current transmitted from the resistance portion 340 with a reference signal Ref.

For example, based on a comparison result, if it is determined that the voltage or current generated between the two resistors R1 and R2 is included in the preset range, the comparing portion 350 can output the digital value DV of '1'. If it is determined that the voltage or current generated between the two resistors R1 and R2 deviates the preset range, the comparing portion 350 can output the digital value DV of '0'.

In this situation, the digital value DV of '0' or '1' can be matched with the information of the resistance portion 340 and can be transmitted to the control driver 400.

Thus, the control driver 400 determines that the overcurrent flows to the sensing capacitor 800 connected to the resistance portion 340 to which the digital value DV of '0' is transmitted.

For example, as shown in FIG. 1, when one sensing capacitor 800 is connected to each of data drivers 300, the control driver 400 can recognize the data driver 300 including the resistance portion 340 in which the digital value DV of '0' is transmitted and determine its location. Therefore, the control driver 400 can determine the chip-on-film 600, on which the data driver 300 having the digital value DV of '0' transmitted thereto is mounted, as the chip-on-film 600 in which the overcurrent is generated.

As another example, as shown in FIG. 4, when two sensing capacitors 800 are connected to each of the data drivers 300, the control driver 400 can recognize the data driver 300 including the resistance portion 340 to which the digital value DV of '0' is transmitted. Particularly, the control driver 400 can recognize which of the first side and the second side of the data driver 300 is provided with the resistance portion 340 to which the digital value DV of '0' is transmitted. Accordingly, the control driver 400 can determine that the overcurrent is generated in the chip-on-film 600 provided with the data driver 300 to which the digital value DV of '0' is transmitted. Particularly, the control driver 400 can determine which of the first and second sides of the chip-on-film 600 has the overcurrent.

Figure 7:
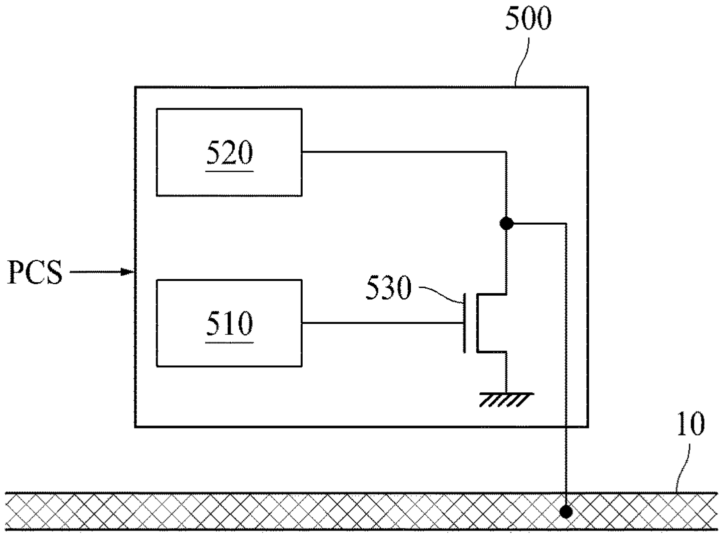
FIG. 7 is an example view illustrating a configuration of a power supply unit applied to the light emitting display apparatus according to an embodiment of the present disclosure.

FIG. 7 is an example view illustrating a configuration of a power supply unit applied to the light emitting display apparatus according to the present disclosure.

As shown in FIG. 7, the power supply unit 500 applied to the light emitting display apparatus according to the present disclosure can include a power switching portion 530 connected between the main low-voltage line 10 and the ground, a switching control portion 510 for turning-on or turning-off the power switching portion 530, and a sensing voltage generating portion 520 for generating the sensing voltage to be supplied to the low-voltage lines 20 during the pixel sensing period.

For example, in a display period for displaying an image on the light emitting display apparatus, the control driver 400 can transmit a power control signal PCS for turning-on the power switching portion 530 to the switching control portion 510 and can transmit a power control signal PCS for turning-off the sensing voltage generating portion 520 to the sensing voltage generating portion 520.

Accordingly, the main low-voltage line 10 can be connected to the ground. That is, in the display period, a second electrode of the light emitting elements ED can be connected to the ground, whereby light can be output from the light emitting elements ED.

Also, when a power-off signal or power-on signal is received in the control driver 400, the control driver 400 can supply a floating control signal to the switching control portion 510. When the switching control portion 510 receives the floating control signal, the switching control portion 510 can turn-off the power switching portion 530 and the main low-voltage line 10 can be floated.

Accordingly, the main low-voltage line 10 is floated, and the signals transmitted from the sensing capacitors 800 are changed to the digital value DV in the data drivers 300 under the floating state of the main low-voltage line and are then transmitted to the control driver 400. That is, when the power-off signal or power-on signal is received, the overcurrent sensing period starts, and the main low-voltage line 10 and the low-voltage lines 20 are floated during the overcurrent sensing period.

Also, when the overcurrent sensing period elapses, the pixel sensing period can be started. In this situation, the control driver 400 can transmit a power control signal PCS for turning-off the power switching portion 530 to the switching control portion 510 and can transmit a power control signal PCS for generating the sensing voltage to the sensing voltage generating portion 520.

Accordingly, the sensing voltage can be supplied to the second electrode of the light emitting elements ED, and threshold voltages or mobility of the driving transistors Tdr or threshold voltages or other characteristics of the light emitting elements ED can be sensed according to the sensing voltage.

Alternatively, in the pixel sensing period, the sensing voltage generating portion 520 can supply the thermal characteristic sensing voltage required for driving the thermal characteristic sensing of the data driver 300 to the data driver 300. Thus, the characteristics of each data driver 300 according to the temperature change of the chip-on-film 600 can be sensed by using the thermal characteristic sensing voltage received through the dummy sensing line DSL.

Figure 8:
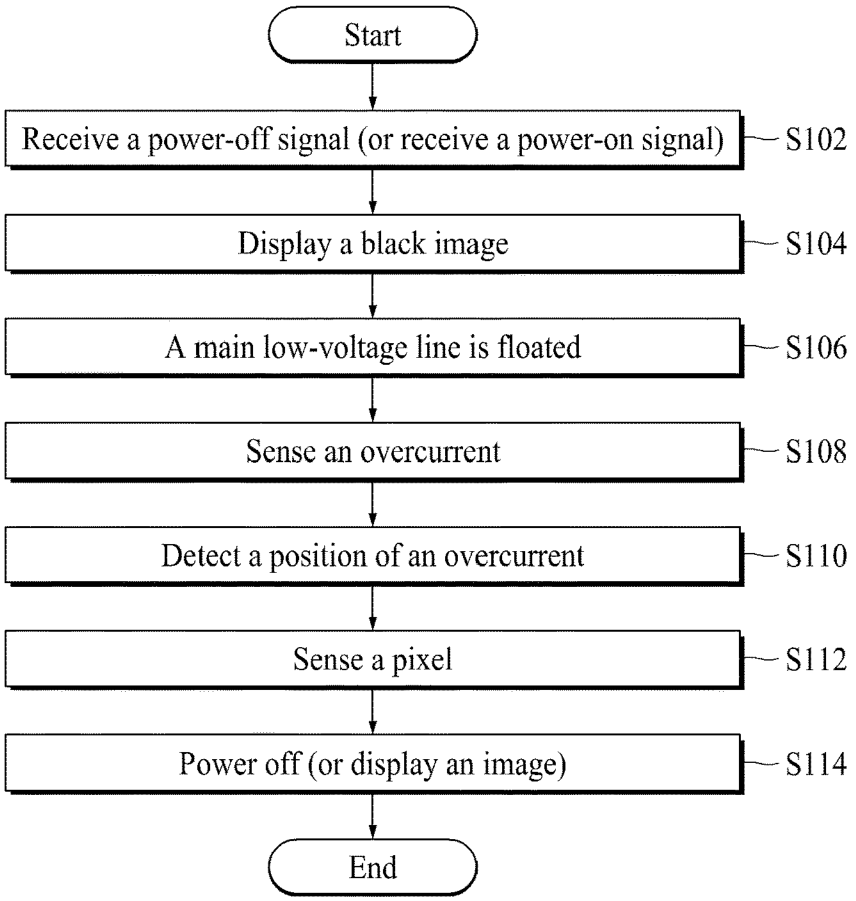
FIG. 8 is a flowchart illustrating an operation method of the light emitting display apparatus according to an embodiment of the present disclosure.
Figure 9:
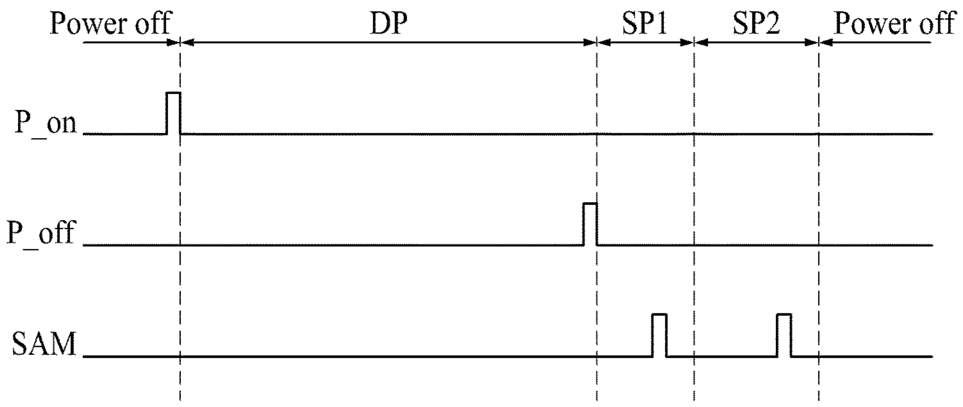
FIG. 9 is an example diagram of signals used in the operation method shown in FIG. 8 according to an embodiment of the present disclosure.

FIG. 8 is a flowchart illustrating an operation method of the light emitting display apparatus according to an embodiment of the present disclosure, and FIG. 9 is an example diagram of signals used in the operation method shown in FIG. 8 according to an embodiment of the present disclosure. In the following description, contents identical or similar to those described with reference to FIGS. 1 to 7 will be omitted or will be briefly described. Particularly, in the following description, an operation method performed when the light emitting display apparatus is powered-off is described as an example of an operation method of the light emitting display apparatus according to the present disclosure. However, the following description can be equally applied when the light emitting display apparatus is powered-on. That is, in FIG. 8, processes (S104 to S112) after receiving the power-off signal can be equally applied to processes after receiving the power-on signal. Also, according to another embodiment, processes (S104 to S112) can be performed periodically during a display operation of the light emitting display apparatus or in response to a user command. After the processes (S104 to S112) are performed, the light emitting display apparatus can be powered-off or an image can be displayed (S114).

In the following description, the power-off signal P_off is the signal for stopping an operation of displaying an image in the display period DP. If the power-off signal P_off is received, the overcurrent sensing period SP1 can be started in the light emitting display apparatus. The power-on signal P_on is the signal for starting an operation of displaying an image.

When the light emitting display apparatus is powered-off, only power is supplied to the light emitting display apparatus, and the light emitting display apparatus is not driven. That is, when the overcurrent sensing period SP1 and the pixel sensing period SP2 pass, the light emitting display apparatus is powered-off. When the light emitting display apparatus is powered-on, the light emitting display apparatus starts an operation of sensing the overcurrent and an operation of sensing the pixel. For example, the light emitting display apparatus can present a black screen or blank screen while the operation of sensing the overcurrent is being carried out, but embodiments are not limited thereto. Then, when the overcurrent sensing period and the pixel sensing period pass, the light emitting display apparatus can display an image. However, as described above, an operation method performed when the light emitting display apparatus is powered-off is described as an example of an operation method of the light emitting display apparatus according to the present disclosure.

First, when an image is displayed in the display period DP of the light emitting display apparatus, the control driver 400 can receive the power-off signal P_off from an external system 900 (S102).

Then, when the power-off signal P_off is received, the control driver 400 can control the gate driver 200, the data driver 300, and the power supply unit 500 so that a black image is displayed.

Next, while the black image is displayed, the control driver 400 transmits the floating control signal to the switching control portion 510 and transmits the power control signal PCS for turning-off the sensing voltage generating portion 520 to the sensing voltage generating portion 520. Accordingly, the power switching portion 530 is turned-off, and the main low-voltage line 10 is floated (S106). When the main low-voltage line 10 is floated, the low-voltage lines 20 are also floated.

The overcurrent sensing period can start from when the floating control signal is supplied to the switching control portion 510, or can start from when the main low-voltage line 10 is floated.

For example, when the (1-1)th switch 321*a* and the (1-2)th switch 321*b* are turned-on by the control signal SAM transmitted from the control driver 400, the overcurrent flowing through the low-voltage line 20 can be transmitted to the sensing portion 320.

Then, when the main low-voltage line 10 is floated, the data drivers 300 can change the signals transmitted from the sensing capacitors 800 to the digital value DV and can transmit the digital value DV to the control driver 400, as described above with reference to FIGS. 1 to 7 (S108).

In this situation, the period in which the (1-1)th switch 321*a* and the (1-2)th switch 321*b* of the sensing portion 320 shown in FIG. 5 are turned-on by the control signal SAM, the period in which the main low-voltage line 10 is floated, and the period in which the comparing portion 350 shown in FIG. 6 compares the voltage or current transmitted from the resistance portion 340 with the reference signal Ref can be set to be shorter than the period in which the sensing capacitors 800 are sufficiently charged.

That is, the overcurrent flowing through any one low-voltage line 20 flows to the main low-voltage line 10, whereby all sensing capacitors 800 connected to the main low-voltage line 10 can be charged with the voltage according to the overcurrent.

In this situation, if the period for sensing the overcurrent is similar to or longer than the period in which the sensing capacitors 800 are charged by the overcurrent, the magnitudes of the signals received from all the sensing capacitors 800 can be the same or similar.

However, if the period for sensing the overcurrent is shorter than the period in which the sensing capacitors 800 are charged by the overcurrent, for example, if the period for sensing the overcurrent is set to ½ of the period in which the sensing capacitors 800 are completely charged by the overcurrent, the magnitude of the voltage charged in the sensing capacitor 800 adjacent to the low-voltage line 20 in which the overcurrent flows can be larger than the magnitude of voltages charged in the sensing capacitors 800 spaced apart from the low-voltage line 20 in which the overcurrent flows. For example, the period in which the sensing capacitors 800 are allowed to be charged by the overcurrent (e.g., while the black screen is displayed after power on or after receiving a power off command) can be set to be longer than the period for sensing the overcurrent.

Accordingly, the sensing capacitor 800 adjacent to the low-voltage line 20 in which the overcurrent flows can be sensed.

Therefore, the period in which the (1-1)th switch 321*a* and the (1-2)th switch 321*b* of the sensing portion 320 shown in FIG. 5 are turned-on, the period in which the main low-voltage line 10 is floated, and the period in which the comparing portion 350 shown in FIG. 6 compares the voltage or current transmitted from the resistance portion 340 with the reference signal Ref can be variously set in consideration of the period in which the sensing capacitors 800 are sufficiently charged.

Then, when the digital values DV are received through the overcurrent sensing process (S108), the control driver 400 can detect the position or exact location where the overcurrent is generated by using the digital values DV (S110).

When the position where the overcurrent is generated is detected, the control driver 400 can transmit the information about the position where the overcurrent is generated to the external system 900. Accordingly, the external system 900 can perform various preset protection functions. For example, the external system 900 can control the control driver 400 so that a warning message related to the overcurrent can be displayed or can drive an alarm system provided in electronic devices. In this situation, the pixel sensing process (S112) can be performed or may not be performed. When the pixel sensing process (S112) is not performed, the light emitting display apparatus can be powered-off. Also, according to an embodiment, when the overcurrent is detected, the control driver 400 or the external system 900 can automatically cut off power to the corresponding data driver 300 and the chip-on-film 600 that are experiencing the overcurrent or turn off the entire light emitting display apparatus, in order to help prevent any further damage.

Then, if the position where the overcurrent is generated is not detected, or if the pixel sensing process (S112) is set to be performed even though there is the overcurrent, the control driver 400 can perform the pixel sensing process (S112).

In the pixel sensing process (S112), at least one of threshold voltages of the driving transistors Tdr, mobility of the driving transistors Tdr, threshold voltages of the light emitting elements ED, other characteristics of the driving transistor Tdr and the light emitting elements ED, and whether the light emitting display panel 100 is burnt can be sensed.

Even in the pixel sensing process (S112), while the switches of the sensing switching portion 322 are turned-on according to the control signal SAM transmitted from the control driver 400, the sensing signals received through the sensing lines SL can be transmitted to the sensing portion 320 and can be changed to the digital values.

Finally, when the pixel sensing process (S112) is finished, the light emitting display apparatus is powered-off (S114).

As described above, in the light emitting display apparatus according to the present disclosure, the chip-on-film 600 in which the overcurrent flows can be detected among the chip-on-films 600, and the position in which the overcurrent flows between the first side and the second side of the chip-on-film 600 through which the overcurrent flows can be detected. In this situation, the various protection functions related to the overcurrent can be performed in the electronic device including the light emitting display apparatus or the light emitting display apparatus. Also, according to an embodiment, the power supplied to a corresponding data driver 300 and chip-on-film 600 experiencing the overcurrent can be independent and automatically turned off (e.g., a switch connected to that data driver can be opened) or the entire light emitting display apparatus can be turned off or powered down based on the overcurrent situation.

Therefore, in the light emitting display apparatus according to the present disclosure, it is possible to prevent the light emitting display panel, the light emitting display apparatus, and the electronic device from being damaged by the overcurrent.

According to the present disclosure, the data driver can sense the overcurrent flowing through the chip-on film, and thus, the chip-on film where the overcurrent occurs can be detected. When the chip-on film where the overcurrent occurs is detected, the control driver can transmit an overcurrent detection signal to the external system.

Accordingly, appropriate measures can be taken by the user before the chip-on film burns or melts due to the overcurrent, thereby preventing the problem of damage to the light emitting display apparatus due to overcurrent.

According to the present disclosure, an overcurrent flowing through the chip-on film can be sensed by a data driver. Accordingly, the accuracy of overcurrent sensing can be improved.

The above-described feature, structure, and effect of the present disclosure are included in at least one embodiment of the present disclosure, but are not limited to only one embodiment. Furthermore, the feature, structure, and effect described in at least one embodiment of the present disclosure can be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A light emitting display apparatus comprising:

a power supply unit configured to supply power to a light emitting display panel having light emitting elements;

a printed circuit board having the power supply unit mounted thereon;

chip-on-films connected between the printed circuit board and the light emitting display panel;

data drivers mounted on the chip-on-films;

a control driver configured to control the power supply unit and the data drivers;

low-voltage lines extended from the printed circuit board to the light emitting display panel through the chip-on-films, the low-voltage lines being connected to the light emitting elements in the light emitting display panel;

a main low-voltage line disposed on the printed circuit board, the main low-voltage line being connected to the low-voltage lines and the power supply unit; and sensing capacitors connected to the main low-voltage line and corresponding to the data drivers, wherein each of the sensing capacitors is connected to one of the data drivers, wherein a (1-1)th sensing capacitor and a (1-2)th sensing capacitor are both connected to a first data driver mounted on a first chip-on-film among the data drivers, wherein the (1-1)th sensing capacitor is mounted at a position of the main low-voltage line adjacent to a first side of the first data driver, and wherein the (1-2)th sensing capacitor is mounted at a position of the main low-voltage line adjacent to a second side of the first data driver.

2. The light emitting display apparatus according to claim 1, wherein the first data driver mounted on the first chip-on-film among the data drivers includes:

a data voltage generating portion configured to supply data voltages to data lines in the light emitting display panel; and a sensing portion configured to change a signal transmitted from a first sensing capacitor among the sensing capacitors to a digital value and transmitting the digital value to the control driver, wherein the first sensing capacitor is connected to a portion of the main low-voltage line that is adjacent to the first data driver.

3. The light emitting display apparatus according to claim 1, wherein the first data driver mounted on the first chip-on-film among the data drivers includes a sensing portion, and wherein the sensing portion is configured to:

change a current transmitted from at least one of the (1-1)th sensing capacitor and (1-2)th sensing capacitor connected to a portion of the main low-voltage line adjacent to the first data driver to a digital value and transmit the digital value to the control driver during an overcurrent sensing period, or generate a digital value by dividing a voltage applied to the at least one of the (1-1)th sensing capacitor and (1-2)th sensing capacitor and transmit the digital value to the control driver.

4. The light emitting display apparatus according to claim 1, wherein the control driver is configured to determine a specific chip-on-film in which an overcurrent occurs among the chip-on-films based on digital values transmitted from the data drivers.

5. The light emitting display apparatus according to claim 1, wherein the first data driver is configured to:

change a signal transmitted from the (1-1)th sensing capacitor to a (1-1)th digital value and transmit the (1-1)th digital value to the control driver during an overcurrent sensing period, and change a signal transmitted from the (1-2)th sensing capacitor to a (1-2)th digital value and transmit the (1-2)th digital value to the control driver during the overcurrent sensing period.

6. The light emitting display apparatus according to claim 1, wherein the control driver is configured to determine a position where an overcurrent occurs from among the first side or second side of the first chip-on-film based on digital values transmitted from the first data driver mounted on the first chip-on-film.

7. The light emitting display apparatus according to claim 1, wherein the power supply unit includes:

a power switching portion connected between the main low-voltage line and the ground; and a switching control portion configured to turn-on and turn-off the power switching portion.

8. The light emitting display apparatus according to claim 7, wherein the control driver is configured to supply a floating control signal to the switching control portion when a power-off or power-on signal is received, and wherein the switching control portion is configured to turn-off the power switching portion when the floating control signal is received.

9. The light emitting display apparatus according to claim 8, wherein the data drivers are configured to change signals transmitted from the sensing capacitors to digital values and transmit the digital values to the control driver after the power switching portion is turned-off.

10. The light emitting display apparatus according to claim 1, wherein the control driver is configured to:

in response to determining that an overcurrent occurs in one of the chip-on-films, output a warning notification to a user.

11. The light emitting display apparatus according to claim 1, wherein the control driver is configured to:

in response to determining that an overcurrent occurs in a specific chip-on-film among the chip-on-films, turn off the specific chip-on-film or turn off the light emitting display apparatus.

12. A light emitting display apparatus comprising:

a display panel configured to display an image;

a main low-voltage line;

a plurality of low-voltage lines connected to the main low-voltage line;

a plurality of chip-on-films including a plurality of data drivers; and a plurality of sensing capacitors, wherein each of the plurality of sensing capacitors is connected to a low-voltage line among the plurality of low-voltage lines and is connected to a data driver among the plurality of data drivers, wherein a (1-1)th sensing capacitor and a (1-2)th sensing capacitor are both connected to a first data driver mounted on a first chip-on-film among the data drivers, wherein the (1-1)th sensing capacitor is mounted at a position of the main low-voltage line adjacent to a first side of the first data driver, and wherein the (1-2)th sensing capacitor is mounted at a position of the main low-voltage line adjacent to a second side of the first data driver.

13. The light emitting display apparatus according to claim 12, further comprising:

a controller configured to:

receive one or more sensing values based on a capacitance of one or more of the plurality of sensing capacitors; and determine a specific chip-on-film that is experiencing an overcurrent situation from among the plurality of chip-on-films based on the one or more sensing values.

14. The light emitting display apparatus according to claim 13, wherein the controller is further configured to:

output a warning notification based on the overcurrent situation, or turn off the specific chip-on-film that is experiencing the overcurrent situation while other chip-on-films among the plurality of chip-on-films remain on, or turn off the light emitting display apparatus based on the overcurrent situation.

15. The light emitting display apparatus according to claim 13, further comprising:

a printed circuit board including the main low-voltage line, portions of the plurality of low-voltage lines and the plurality of sensing capacitors, wherein the plurality of chip-on-films are connected between the printed circuit board and the display panel, and wherein the plurality of low-voltage lines extend from the printed circuit board to the display panel via the plurality of chip-on-films.

16. The light emitting display apparatus according to claim 15, wherein the controller is disposed in or on the printed circuit board.

17. The light emitting display apparatus according to claim 13, wherein at least one data driver among the plurality of data drivers is connected to two sensing capacitors among the plurality of sensing capacitors, and wherein the controller is configured to detect an overcurrent situation in the at least one data driver based on capacitance values of the two sensing capacitors.

18. The light emitting display apparatus according to claim 13, wherein the controller is configured to:

float the main low-voltage line during an overcurrent sensing period.

19. The light emitting display apparatus according to claim 13, wherein the controller is configured to:

in response to receiving a power off signal for the light emitting display apparatus or a power off signal for the light emitting display apparatus, float the main low-voltage line during an overcurrent sensing period.

20. The light emitting display apparatus according to claim 13, wherein the controller is configured to:

charge the plurality of sensing capacitors during a charging period, and receive sensing values from the plurality of sensing capacitors during an overcurrent sensing period after the charging period, wherein the charging period is longer than the overcurrent sensing period.

21. The light emitting display apparatus according to claim 20, wherein the controller is configured to:

sense a characteristic of one or more pixels in the display panel after the overcurrent sensing period.

* * * * *